United States Patent
Aikens et al.

(10) Patent No.: US 8,631,389 B2
(45) Date of Patent: Jan. 14, 2014

(54) METHODS AND APPARATUS FOR AUTHENTICATION OF CONFIGURATION ITEMS VIA CONFIGURATION ITEM CHANGE ANALYSIS

(75) Inventors: Glenn C. Aikens, Raleigh, NC (US);
Melissa Jane Buco, Amawalk, NY (US);
Maheswaran Surendra, Croton-on-Hudson, NY (US);
Christopher Ward, Glen Ridge, NJ (US); Steve Weinberger, Lewis Center, OH (US); Sam Shixiong Yang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2024 days.

(21) Appl. No.: 11/679,996

(22) Filed: Feb. 28, 2007

(65) Prior Publication Data

US 2008/0209398 A1    Aug. 28, 2008

(51) Int. Cl.
*G06F 9/44* (2006.01)

(52) U.S. Cl.
USPC ............................................. 717/121; 726/2

(58) Field of Classification Search
None
See application file for complete search history.

(56) References Cited

U.S. PATENT DOCUMENTS

| | | | |
|---|---|---|---|
| 7,409,398 B1 * | 8/2008 | Flam et al. | 1/1 |
| 7,757,269 B1 * | 7/2010 | Roy-Chowdhury et al. | 726/1 |
| 2002/0099586 A1 * | 7/2002 | Bladen et al. | 705/7 |
| 2002/0112095 A1 * | 8/2002 | Ford et al. | 709/330 |
| 2005/0097149 A1 * | 5/2005 | Vaitzblit et al. | 707/202 |
| 2005/0203871 A1 * | 9/2005 | Devalla et al. | 707/1 |
| 2005/0222969 A1 * | 10/2005 | Yip et al. | 707/1 |
| 2006/0004875 A1 | 1/2006 | Baron et al. | |
| 2006/0161444 A1 * | 7/2006 | Lubrecht et al. | 705/1 |
| 2007/0100712 A1 * | 5/2007 | Kilpatrick et al. | 705/29 |
| 2007/0203952 A1 | 8/2007 | Baron et al. | |

OTHER PUBLICATIONS

S M Thompson, "Configuration Management—keeping it all together", 1997, BT Technol J vol. 15 No. 3.*
C. Ward et al., "Integrated Change and Configuration Management," IBM Systems Journal, Jul. 2007, pp. 459-478, vol. 46, No. 3.
J. Metcalfe, "How to Select & Implement the Right CMDB," Apr. 2007, itSM Solutions, 7 pages.
H. Marquis, "Configuration Management for the Rest of Us," Jul. 2006, itSM Solutions, 5 pages.

* cited by examiner

*Primary Examiner* — Chat Do
*Assistant Examiner* — Jue Wang
(74) *Attorney, Agent, or Firm* — Louis J. Percello; Ryan, Mason & Lewis, LLP

(57) ABSTRACT

Techniques for authenticating one or more configuration items in an information repository are provided comprising the step of running an audit on the one or more configuration items in accordance with a change history of each of the one or more configuration items and one or more request for change identifiers.

8 Claims, 5 Drawing Sheets

| Time | Event | RFCID | CI Change | CI Actual | Change History | Reconciled |
|---|---|---|---|---|---|---|
| t0 | CI1 discovered (by discovery) | | | name=server1 ipaddr=1.2.3.4 | | |
| t1 | CI1 admin update | | owner=brown ipaddr=1.2.3.5 | name=server1 ipaddr=1.2.3.5 owner=brown | ipaddr=1.2.3.4 | |
| t2 | CI1 admin update (to prod state) | 4321 | lifecycle=production owner=green ipaddr=1.2.3.6 | name=server1 ipaddr=1.2.3.6 owner=green lifecycle=production | owner=brown ipaddr=1.2.3.5 lifecycle= | |
| t3 | CI1 updated (by discovery) | | ipaddr=1.2.3.4 | name=server1 ipaddr=1.2.3.4 owner=green lifecycle=production | ipaddr=1.2.3.6 | |
| t4 | CI1 updated (by discovery) | | ipaddr=1.2.3.6 | name=server1 ipaddr=1.2.3.6 owner=green lifecycle=production | ipaddr=1.2.3.4 | |
| t5 | CI1 admin update (new owner approved) | 4322 | lifecycle=production owner=blue | name=server1 ipaddr=1.2.3.6 owner=blue lifecycle=production | owner=green | |

FIG. 3

Audit Changes Grouped by Attribute Name

| | Old Value | New Value | Change Start Time | Change Type | Change Time | Last Auth Time | Last Auth Status | RFC IDs | User ID |
|---|---|---|---|---|---|---|---|---|---|
| SCHED_NAME | | | | | | | | | |
| by 5/8 2006-05-08 21:56:00.0 | | | | | | | | | |
| unknown AxComputerSystemTemplate/logonMessage | | | | | | | | | |
| Component Type | | | | | | | | | |
| com.collation.platform.model.topology.sys.DataFile | unknown | unknown | 2005-05-08 09:57:15 PM | Updated | 2006-04-14 05:59:43 PM | 2005-05-08 09:57:15 PM | unknown | No RFC | Yang, Sam |
| AxComputerSystemTemplate/ AxComputerSystemTemplate/ | | | | | | | | | |
| Component Type | | | | | | | | | |
| com.collation.platform.model.topology.sys.DataFile | unknown | unknown | 2005-05-08 09:57:15 PM | Updated | 2006-04-14 05:59:43 PM | 2005-05-08 09:57:15 PM | unknown | No RFC | Yang, Sam |
| AxComputerSystemTemplate/ AxComputerSystemTemplate/sysAttributes | | | | | | | | | |
| Component Type | | | | | | | | | |
| com.collation.platform.model.topology.sys.DataFile | unknown | unknown | 2005-05-08 09:57:15 PM | Updated | 2006-04-14 05:59:43 PM | 2005-05-08 09:57:15 PM | unknown | No RFC | Yang, Sam |
| AxComputerSystemTemplate/sysAttributes .raleigh.ibm.com | | | | | | | | | |
| Component Type | | | | | | | | | |

FIG. 4

METHODS AND APPARATUS FOR AUTHENTICATION OF CONFIGURATION ITEMS VIA CONFIGURATION ITEM CHANGE ANALYSIS

CROSS REFERENCE TO RELATED APPLICATIONS

This application is related to the U.S. patent application Ser. No. 11/679,999, entitled "Methods and Apparatus for Configuration Item Lifecycle State Transitions," which is filed concurrently herewith and incorporated by reference herein, and which has since issued as U.S. Pat. No. 7,913,227 on Mar. 22, 2011.

FIELD OF THE INVENTION

The present invention relates to information technology (IT) systems and, more particularly, methods and apparatus for providing authentication of configuration items (CIs) in a configuration management database (CMDB) through an analysis of CI changes and associated requests for change (RFCs).

BACKGROUND OF THE INVENTION

Large and complex IT service management environments that provide multiple services to a plurality of customers can create an unmanageable number of entities. It is best practice to make use of a logically centralized repository for the storage and access of the data, commonly referred to as a CMDB. The configuration data stored in this CMDB includes a representation of managed resources; such a representation is called a CI. CMDB CIs represent an extensive range of logical and physical entities and their complex relationships. A typical implementation of a CMDB may contain more than 800 abstract object classes, with implicit and explicit relationships between them that may be extended in an open-ended fashion.

Organizing entities into dependency trees or graphs for a high-level view of the topology eases systems management. A CMDB is broad and semantically rich enough that it may apply to higher layers such as, for example, a business process or a distributed application. A CMDB is also granular enough to represent, for example, tables in a database or enterprise Java beans (EJBs) used in an enterprise application. In real-world enterprise systems, there may be tens of thousands or more entities with complex relationships between them. Compositions are ideally suited to multi-layered topologies.

The CMDB records the existence, attributes, relationships, history and status of CIs. An attribute is a descriptive characteristic of a CI such as, for example, make, model, serial number, or location. A relationship describes associations, such as, for example, the dependency and/or connectivity between CIs.

Changes to CIs may be reflected within the CMDB by maintaining a record of such changes called a change history. As changes are made to CIs, some changes may be authorized by reference to controlling documents such as Request for Changes (RFCs) in accordance with IT Infrastructure Library best practices. These authorized changes will be intermingled with unauthorized changes as part of the overall change history. Therefore in looking at the current state of a CI, the administrator, or user of the CMDB, will be unaware of the correct authorized state of the CMDB, and unable to understand it without analyzing all changes since the inception of the CI.

SUMMARY OF THE INVENTION

In accordance with the aforementioned and other objectives, the embodiments of the present invention are directed towards methods and apparatus for CI lifecycle state management and authentication within a CMDB.

For example, in one aspect of the invention, techniques for authenticating one or more configuration items in an information repository comprising the step of running an audit on the one or more configuration items in accordance with a change history of each of the one or more configuration items and one or more request for change identifiers.

In additional embodiments of the present invention, a change history for each of the one or more configuration items and request for change identifiers utilized for each of the one or more configuration items may be retrieved for a specified time period. An audit report may also be generated for the one or more configuration items.

In a further embodiment it may be determined if each attribute value change in the change history of each of the one or more configuration items is authorized. A marker may be recorded in the change history through which a given configuration item has authorized changes.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 shows a user change history, according to an embodiment of the present invention;

FIG. 4 shows a sample audit report, according to an embodiment of the present invention.

DETAILED DESCRIPTION OF PREFERRED EMBODIMENTS

As will be described in detail below, the embodiments of the present invention introduce techniques for authenticating lifecycle state transitions of CIs in a CMDB. A CI may be augmented with properties so that it is possible to review the change history from a marker position and identify the authorized variance report data generated from just this portion of the change history. A CI audit is the process of verifying changes made to a CI. Changes that are made to a CI as a result of a RFC are considered authorized changes in accordance with best practice.

Figure 1:
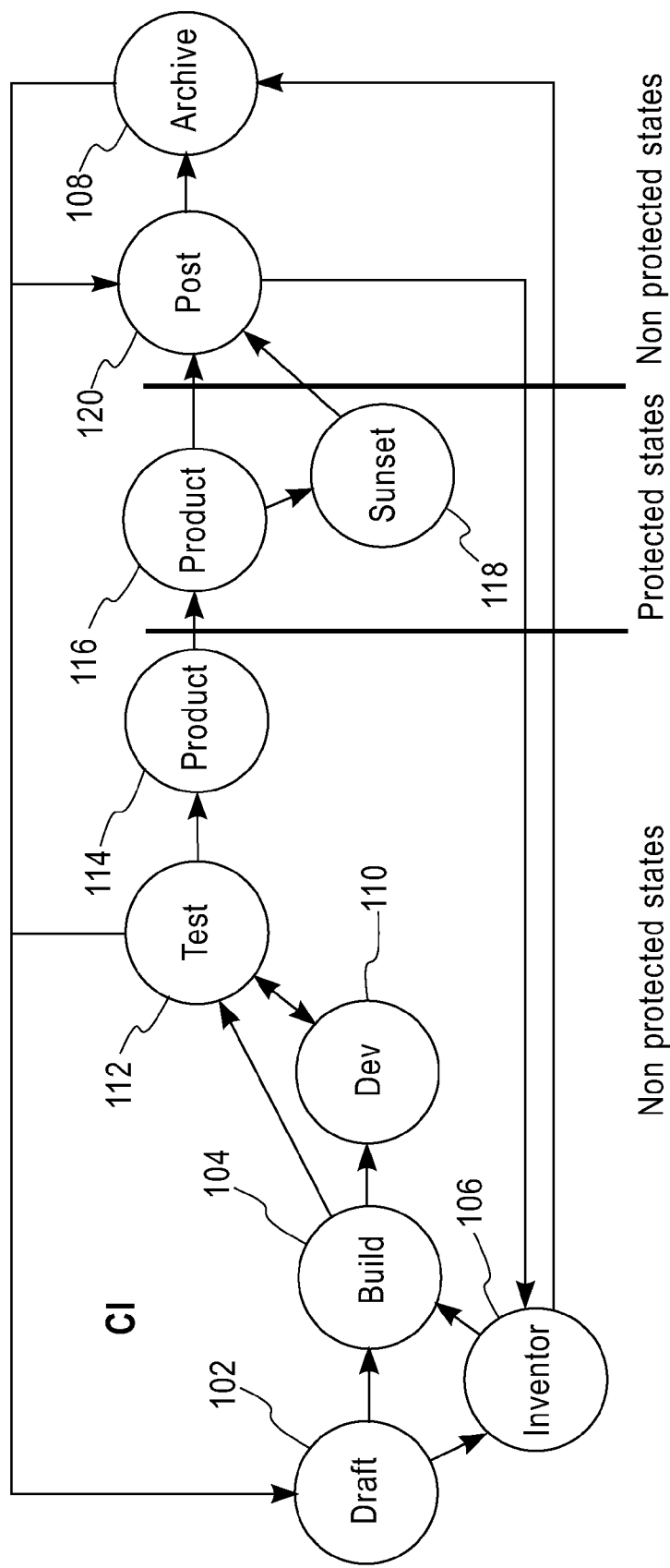
FIG. 1 shows a lifecycle state diagram illustrating available lifecycle states and transitions for a CI, according to an embodiment of the present invention.

Referring initially to FIG. 1, a lifecycle state diagram illustrates available states for a CI and permissible lifecycle state transitions, according to an embodiment of the present invention. The lifecycle state of a CI is the span of time that begins when the CI is created and ends when it is no longer available for use. The lifecycle state of a CI is stored in the CMDB as a CI attribute and may be one of the following states: unknown, other, ordered, received, in-test, tested, installed, enabled, disabled, in-maintenance, retired, archived, accepted, draft, build, validate, production-ready, sunset, postproduction, inventory, development, and offline.

In the specific embodiment of a CI lifecycle state diagram shown in FIG. 1, a draft state 102 is shown having transitions to a build state 104 and an inventory state 106. Inventory state 106 has transitions to an archive state 108 as well as build state 104. Build state 104 has transitions to a development state 110 and a tested state 112. Development state 110 also has a transition to tested state 112. Tested state 112 has a transition to a production-ready state 114 as well as draft state 102. Production-ready state 114 has a transition to a production state 116, a protected lifecycle state. Production state 116 has a transition to a sunset state 118, another protected lifecycle state. Both production state 116 and sunset state 118 have transitions to postproduction state 120. Post-production state 120 has a transition to inventory state 106 and archive state 108.

In accordance with an embodiment of the present invention, the lifecycle state attribute is read-only when viewed in the work with configuration items portlet. It can be modified in a change lifecycle state portlet or by calling a Web Services CTGPMCMControlCIState process.

A CI with its lifecycle state attribute in a protected state is considered to be under change control. A state should be designated as protected if changes to the CI would have a significant impact on the environment, with such changes accountable to an RFC. As shown the embodiment of the present invention in FIG. 1, protected lifecycle states include production state 116 and sunset state 118. Therefore, changes to the lifecycle state either to or from protected states require association with an RFC. If a CI's lifecycle state transition does not involve protected states, an RFC is not required for the transition. A lifecycle state may be set as protected by modifying the protectedLifecycleStates property in the ciLifecycleMgmt.txt file. By default, production state 116 and sunset state 118 are protected.

When a CI is transitioned into, from or between protected lifecycle states, the RFC relationship is updated to reflect this fact. For cases where the CMDB is used to store RFCproxies and maintain a refers relationships between CIs and RFCproxies, changes to the lifecycle state which involve protected states are reflected in updates to the AffectedTime property of an affects relationship. For cases where an RFC external to the CMDB is cited, such as, for example, useRFCProxiesOnly property described below, the association is recorded in an RFC_RECONCILATION table within the process database.

An example of the importance of a protected lifecycle state would be the identification of a server as a CI in a managed environment. The server CI goes through the following unprotected lifecycle states: installed, testing and production-ready, respectively. When the server is put into production, the lifecycle state needs to be changed to production state, which is a protected lifecycle state. An RFC is required to change the lifecycle state of the server CI to production state, because putting the server into production is having a significant impact on the environment.

A CI audit lists changes that have been made to a CI, shows the changed attributes, when the changes were made, and the values of the attributes before and after the changes. Audits may be run on specific CIs or on all CIs of a particular type. Audits may be created and run immediately or scheduled to run at specific times. When an audit is run, the results of the audit are saved as input to a report which is saved in the CMDB.

Embodiments of the present invention introduce two properties into a CI, a LastAuditStatus and a LastAuditTime, and an AffectsTime property on the Affects relationship between the CI and the RFC. These properties, when used in the manner described below, provide a methodology by which the authorized state of a CI can be ascertained from reviewing only a limited amount of change history information, in accordance with one of the reports that can be created.

The change history for a CI reflects all changes made to the CI, with values recorded with time stamps. Change history can be used along with RFCs by the user to determine if the change is authorized. The association between CIs and RFCs is made by relationships, such as, for example, an Affects relationship. The changes to the CI which are related to a RFC can be likewise reflected in an AffectedTime property on the Affects relationship, which is updated whenever an RFC related update is made.

A reconcile "marker" can be used to indicate points in the change history when CI is deemed correct. This reconcile marker, LastAuditStatus, taken with the associated timestamp, LastAuditTime, provide the needed detail.

If the reconcile marker is advanced by analysis of changes and RFC association, then subsequent analysis need only review changes and associated RFCs from the time last discovery was run back to reconcile marker when analyzing for new variances. A user may be responsible for analyzing change history and RFCs from a last reconcile marker point up to last discovery updates in order to determine if the last reconcile marker should be moved to that time.

Figure 2:
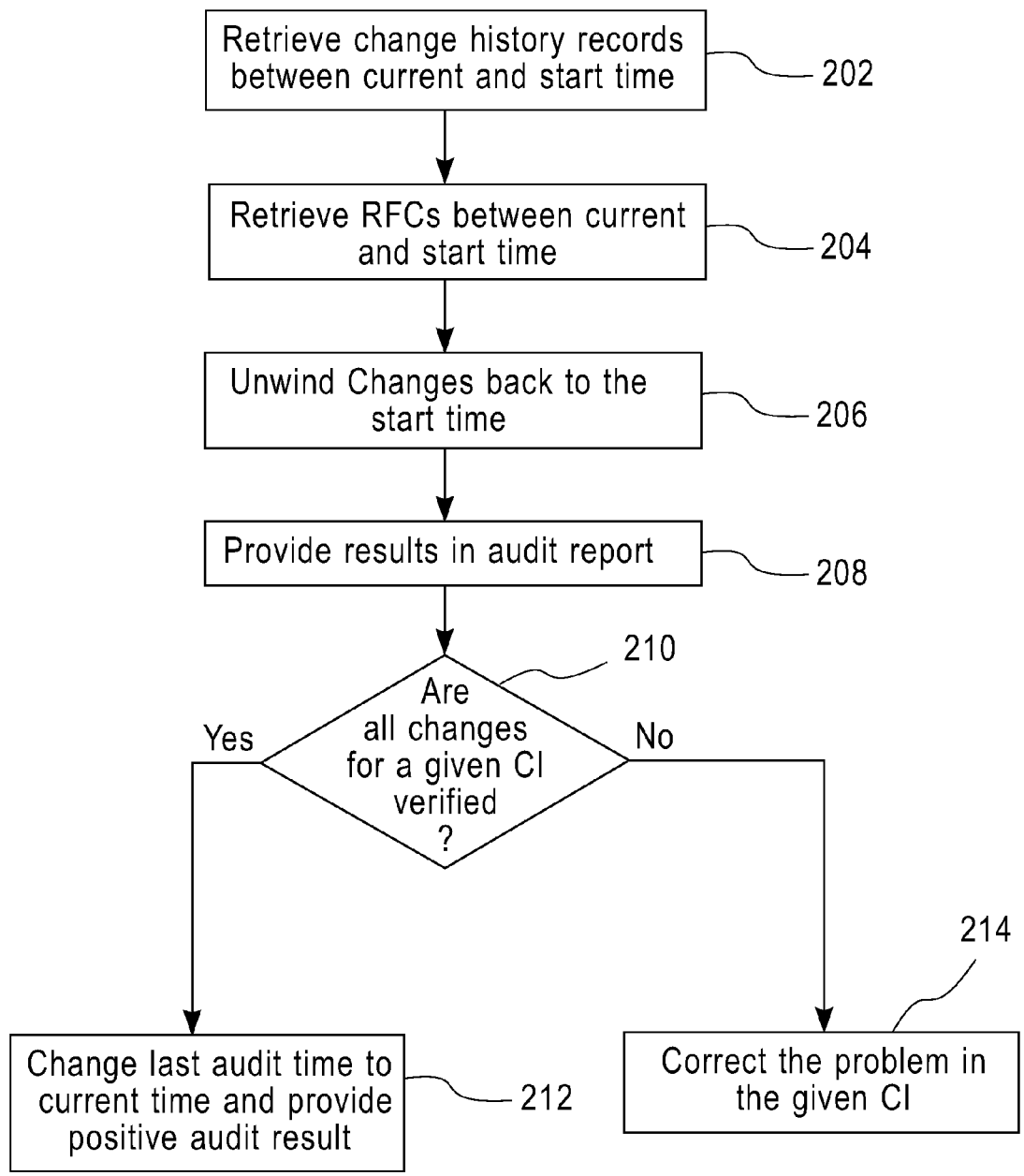
FIG. 2 shows a flow diagram illustrating a CI state transition authentication methodology, according to an embodiment of the present invention.

Referring now to FIG. 2, a flow diagram illustrates a CI state transition verification methodology, according to an embodiment of the present invention. The methodology begins in block 202 where the ChangeHistoryCI process retrieves all the change history records between a current time and a user-defined start time. In block 204, the audit process also retrieves the RFCs between the current time and the user-defined start time. If any CI has no attribute changes since the LastAuditTime, the LastAuditTime is set to current time. A detailed description of the change history provided to the user is provided in FIG. 3.

Within actual CIs, a user can traverse back through a change history log and "unwind" prior changes. In block 206, prior changes are unwound back a user-defined start time, or a last reconciled marker, in order to provide the authorized view at that point. Changes that have taken place to CIs are reviewed as they are associated with RFCs. More specifically, the results of the retrieved change history are compared with the retrieved RFCs to distinguish changes that have occurred without an RFC from changes that have occurred with an RFC.

In block 208, all the above results are shown in the audit report. A detailed description of the audit report is provided in FIG. 4. A configuration librarian works on the audit report, for each CI having the change history record. In block 210, for each CI, it is determined if all the attribute changes are "good" changes, more specifically, if the changes come from RFC implementation or system processes. If yes, the LastAuditTime is changed to current time and LastAuditResult to "OK" using the PMCMControlCIStateProcess in block 212. Thus, the user can advance a reconciled marker to a further time if they are satisfied with the state of the CI at that point. If not, the configuration librarian needs to understand the changes, create RFCs or other methods to correct the problem in block 214. No change will be made to the above two fields. If the problem is fixed, the configuration librarian will see the change record at next audit time between that time and the LastAuditTime. The configuration librarian needs to check if the attribute values are back to the old value.

It is assumed that all the above procedures work with current CIs data. The procedures work depends on a configuration librarian's experience or customer's process. It is also assumed that the procedure only goes through how to generate the variance for the existing CIs, not CIs existing in LastAuditTime but not existing in current audit time.

Notice that if the relationship between the CI and the RFC, an Affected relationship, is augmented with a property LastAffectedTime, which is updated whenever an authorized change is made to the CI for this RFC, then it is possible to improve the quality of the remediation by analysis of the change history data associated with the Affects relationship. This occurs because the audit report can associate authorized changes in the change history with updates to the LastAffectedTime to get an exact on the timestamp for authorized changes.

Referring now to FIG. 3, a change history is shown, according to an embodiment of the present invention. This may be considered a detailed description of the change history records and RFCs retrieved in blocks 202 and 204 of FIG. 2. Specifically, the change history of FIG. 3 illustrates specific records between time t0 and t5. Further, the change history provides a description of the type of event occurring at each time entry. Certain events, for example at time t2 and t5 are associated with an RFC identification number. The change history further describes the change that is occurring to the CI as well as the actual attributes of the CI for each time entry.

Referring now to FIG. 4, a sample audit report is shown, according to an embodiment of the present invention. This may be considered a detailed description of block 208 of FIG. 2. The sample audit report describes the component type and an old and new value if known. Further, the sample audit report provides a change start time, a change type, a change time, a last authentication time, a last authentication status, any RFC identification numbers, and a user identification.

Figure 5:
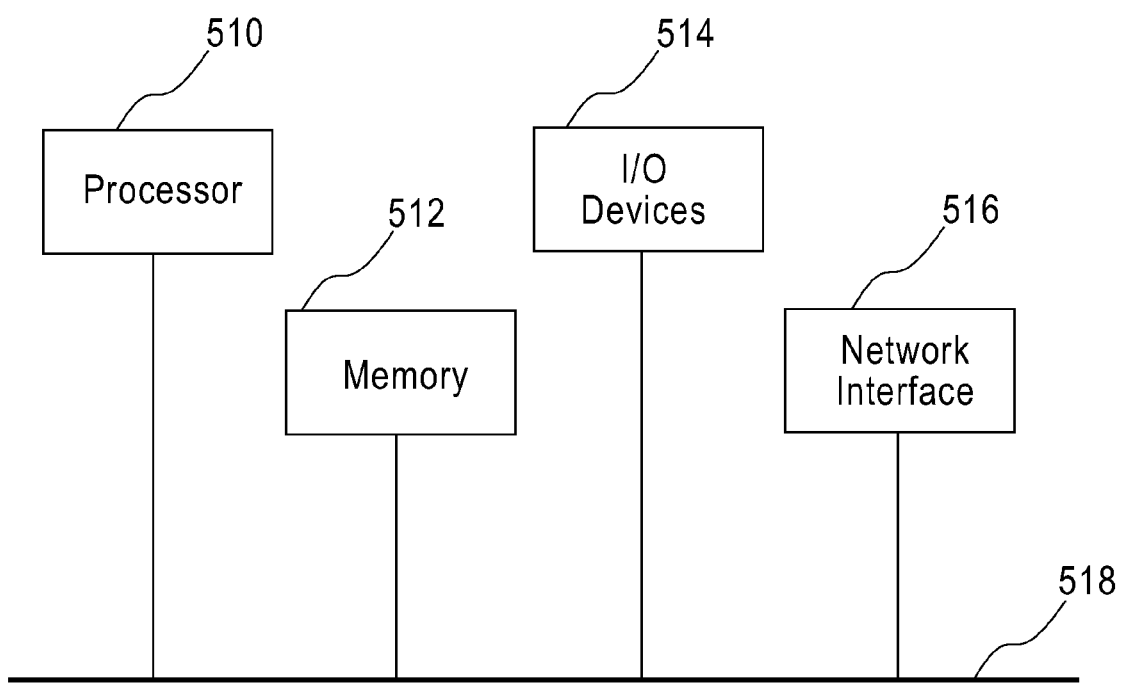
FIG. 5 is a diagram illustrating an illustrative hardware implementation of a computing system in accordance with which one or more components/methodologies of the present invention may be implemented, according to an embodiment of the present invention.

Referring now to FIG. 5, a block diagram illustrates an exemplary hardware implementation of a computing system in accordance with which one or more components/methodologies of the invention (e.g., components/methodologies described in the context of FIGS. 1-4) may be implemented, according to an embodiment of the present invention.

As shown, the computer system may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for authenticating one or more configuration items in a configuration management database comprising steps of:

retrieving a change history for each of the one or more configuration items for a specified time period;

retrieving requests for change identifiers utilized for each of the one or more configuration items in the specified time period;

generating an audit report for the one or more configuration items in accordance with the retrieved change history and the retrieved request for change identifiers;

determining if an attribute value change in the change history of each of the one or more configuration items is authorized; and recording a marker in the change history through which a given configuration item has authorized changes;

wherein the step of determining if each attribute value change is authorized comprises the step of comparing changes in the retrieved change history to the retrieved request for change identifiers for each of the one or more configuration items to distinguish attribute value changes that occurred without a request for change from attribute value changes that occurred with a request for change, the attribute value changes that occurred without a request for change are determined to be unauthorized changes, and the attribute values changes that occurred with a request for change are determined to be authorized changes;

wherein the step of comparing changes in the retrieved change history to retrieved request for change identifiers comprises the steps of:

unwinding prior changes to a last recorded marker for each of the one or more configuration items, wherein changes prior to the last recorded marker are authorized changes; and reviewing changes subsequent to the last recorded marker in accordance with the retrieved request for change identifiers for each of the one or more configuration items.

2. The method of claim 1, wherein an audit is run from a previously recorded marker to last discovered changes of each of the one or more configuration items.

3. The method of claim 1, wherein the step of recording a marker comprises the step of recording a marker to a current time if changes in the retrieved change history for a given configuration item are acceptable in accordance with retrieved request for change identifiers.

4. The method of claim 1, wherein the step of recording a marker comprises the step of recording a marker to a current time when there are no changes in a change history for a given configuration item of the one or more configuration items.

5. The method of claim 1, wherein the change history comprises values of a configuration item over time associated with a time stamp.

6. The method of claim 1, wherein, in the step of generating an audit report, the audit report comprises the change history, a last audit time, a last audit status, and request for change identifiers that may be associated with changes in the change history.

7. An apparatus, comprising:
a processor;
at least one memory coupled to the processor, wherein the memory contains one or more programs which when executed on the processor perform a method for authenticating one or more configuration items in a configuration management database comprising steps of:
retrieving a change history for each of the one or more configuration items for a specified time period;
retrieving requests for change identifiers utilized for each of the one or more configuration items in the specified time period;
generating an audit report for the one or more configuration items in accordance with the retrieved change history and the retrieved request for change identifiers;
determining if an attribute value change in the change history of each of the one or more configuration items is authorized; and
recording a marker in the change history through which a given configuration item has authorized changes;
wherein the step of determining if each attribute value change is authorized comprises the step of comparing changes in the retrieved change history to the retrieved request for change identifiers for each of the one or more configuration items to distinguish attribute value changes that occurred without a request for change from attribute value changes that occurred with a request for change, the attribute value changes that occurred without a request for change are determined to be unauthorized changes, and the attribute values changes that occurred with a request for change are determined to be authorized changes;
wherein the step of comparing changes in the retrieved change history to retrieved request for change identifiers comprises the steps of:
unwinding prior changes to a last recorded marker for each of the one or more configuration items, wherein changes prior to the last recorded marker are authorized changes; and
reviewing changes subsequent to the last recorded marker in accordance with the retrieved request for change identifiers for each of the one or more configuration items.

8. An article of manufacture, comprising a non-transitory machine readable medium containing one or more programs which when executed perform a method for authenticating one or more configuration items in a configuration management database comprising steps of:
retrieving a change history for each of the one or more configuration items for a specified time period;
retrieving requests for change identifiers utilized for each of the one or more configuration items in the specified time period;
generating an audit report for the one or more configuration items in accordance with the retrieved change history and the retrieved request for change identifiers;
determining if an attribute value change in the change history of each of the one or more configuration items is authorized; and
recording a marker in the change history through which a given configuration item has authorized changes;
wherein the step of determining if each attribute value change is authorized comprises the step of comparing changes in the retrieved change history to the retrieved request for change identifiers for each of the one or more configuration items to distinguish attribute value changes that occurred without a request for change from attribute value changes that occurred with a request for change, the attribute value changes that occurred without a request for change are determined to be unauthorized changes, and the attribute values changes that occurred with a request for change are determined to be authorized changes;
wherein the step of comparing changes in the retrieved change history to retrieved request for change identifiers comprises the steps of:
unwinding prior changes to a last recorded marker for each of the one or more configuration items, wherein changes prior to the last recorded marker are authorized changes; and
reviewing changes subsequent to the last recorded marker in accordance with the retrieved request for change identifiers for each of the one or more configuration items.

\* \* \* \* \*